United States Patent Office
3,475,099
Patented Oct. 28, 1969

3,475,099
APPARATUS FOR SPECTROCHEMICAL ANALYSIS
Kazuo Yasuda and Koichi Uchino, Katsuta-shi, Japan, assignors to Hitachi, Ltd., Chiyoda-ku, Tokyo-to, Japan
Filed Aug. 5, 1966, Ser. No. 570,514
Claims priority, application Japan, Aug. 11, 1965, 40/65,594
Int. Cl. G01j 3/36
U.S. Cl. 356—82
16 Claims

ABSTRACT OF THE DISCLOSURE

Spectrochemical analysis is accomplished by a flame vaporizor into which a sample is sprayed in combination with a radiant energy source to which a photo-detector is optical attached whereby radiation which passes through the flame is reflected back to the source to cause resonant radiation. A light chopper is inserted in the radiation beam and a frequency responsive filter is connected to the photo-detector.

---

This invention relates to an apparatus for spectrochemical analysis and, more particularly, to an apparatus for atomic absorption analysis wherein a line emission source for atomic absorption analysis is used at the same time as a part of detecting means, or a filter for selecting the line to be measured. This is achieved by making use of resonance radiation phenomenon.

A method so-called atomic absorption analysis such as disclosed in "Spectro chimica Acta," 7,108 (1955), has been utilized for spectrochemical analysis of many elements heretofore difficult to analyze. The principle of this method is that an atomic vapor absorbs radiation at certain specific wavelengths dependent upon the elements in the vapor. For producing the atomic vapor a flame is usually used into which a solution of the sample substance is sprayed. Radiation from a source containing a spectral line of the element to be investigated is passed through the flame and the absorption of radiation at the particular wavelength is measured as an indication of the amount of the atomized element.

Known apparatuses which use the so-called atomic absorption phenomenon comprise (1) means for producing a beam of radiation the spectrum of which contains an atomic spectral line characteristic of an element to be analyzed, for instance, a discharge lamp having an electrode made of the element to be analyzed, (2) means for introducing the substance in the form of an atomic vapor, for instance, a so-called atomizer and a flame, (3) means for detecting the beam after the beam passes through the vapor, for instance, a detector using an electric photocell, (4) means for eliminating from the beam radiation of wavelengths other than that of said atomic spectral line, for instance, spectral filters comprised of a multiplicity of monochrometers or prisms, and (5) means for eliminating or compensating for the effect on the indicator of various causes such as radiation emitted by the vapor, fluctuations in their intensity of the beam, etc.

Use of known apparatuses, although of wide application, has been limited in certain areas because of their complicated structures and high cost. In order to improve sensitivity or precision of the apparatus, filters (means (4) above) need so many monochrometers that, only the whole apparatus becomes very expensive and large but also adjustment and operation of the apparatus in use becomes quite complicated and difficult. Furthermore, since compensating means (means (5) above) have a direct influence on the precision of the apparatus, it inevitably becomes complex too and further complicates the overall structure.

The main object of the present invention is to provide an improved apparatus for spectrochemical analysis using a so-called atomic absorption phenomenon which has a much simpler configuration than known devices.

Another object of the present invention is to provide an apparatus of this character in which while retaining its precision and merits as an instrument, the need for complex filtering means (means (4) above) for eliminating from the beam radiation of wavelengths other than that of said atomic spectral line, is obviated.

A further object of the present invention is to provide an apparatus of this character which is much easier to handle and adjust than known apparatuses.

A still other object of the present invention is to provide an apparatus of this character in which back ground error signals due to emission of the atomized substance in the flame is considerably reduced.

These and other objects and merits of the present invention will become apparent from following detailed descriptions taken in conjunction with the accompanying drawings, in which.

Figure 1:
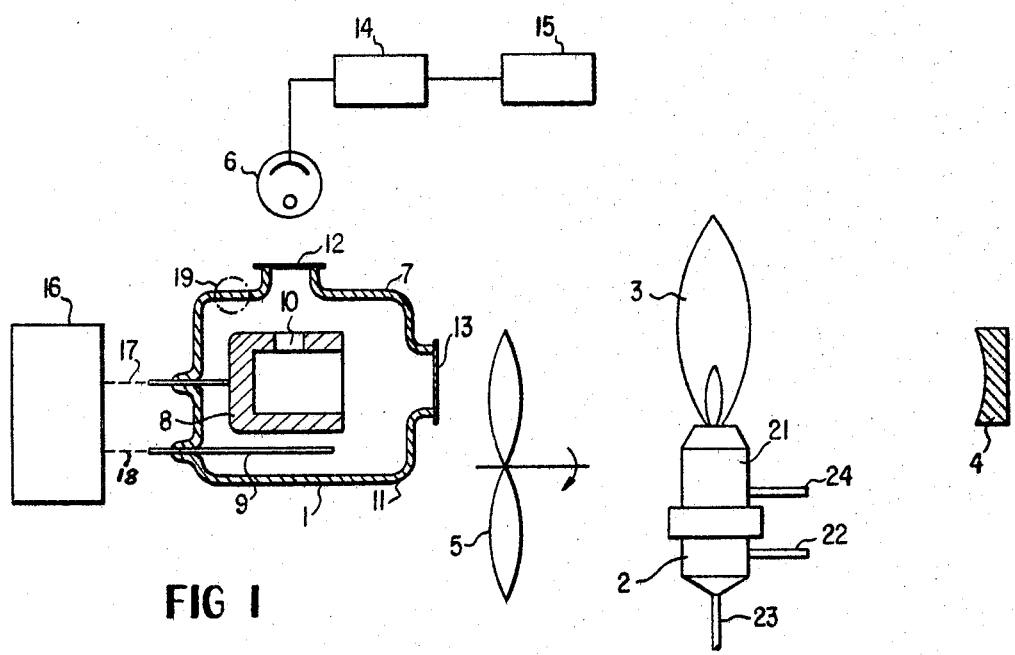
FIGURE 1 is a schematic diagram of an apparatus embodying the present invention.

FIGURE 1 shows a schematic diagram of an apparatus embodying the present invention. First the apparatus will be briefly described as comprising a beam producing means 1, atomic vapor introducing means 2, beam turning back means 4, beam interrupting means 5, detecting means 6, and radiation intensity detecting means 6. The radiant beam, containing a selected atomic spectral line and produced by beam producing means 1, is passed through an atomic vapor or a flame 3 in the atomic vapor introducing means 2, and is turned back by the beam turning back means 4 to the beam producing means 1. At the same time the beam containing the selected atomic spectral line is turned back, it gives a variation in radiation intensity of the beam producing means by virtue of the resonance radiation phenomenon. Some of the radiation beam produced by means 1 is absorbed by the atomic vapor while it is passed through the vapor and the quantity of the absorption has a peculiar relationship with the concentration of the atomic vapor as is well known in atomic absorption instruments. Consequently, the variation in radiation intensity of the beam producing means by virtue of the resonance radiation phenomenon can be used to indicate the amount of the atomized substance in the flame.

Figure 2:
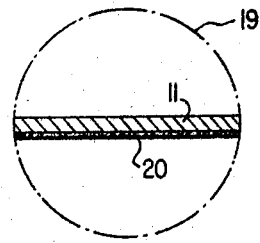
FIGURE 2 is a partial view of beam producing means employed in this invention.

Now, a more detailed description of the apparatus will be given according to the drawings. Beam producing means 1 is comprised by an evacuated container 11, which may contain inert gas such as argon, helium, or neon, a source of electric energization potential 16, and a pair of electrodes 8, 9. The source is preferably comprised by an adjustable direct current voltage source, or a constant direct current source. The evacuated container 11 made of a metal or glass assembly has a pair of transparent windows 12, 13. Preferably, a thin layer 20 for absorbing radiation reflection is provided over desired portions of the inner wall of the container 11 as shown in FIGURE 2. A cathode 8 is composed of a hollow tube shaped electrode made of the same substance as that to be analyzed and is fixed to the container 11. An anode 9 comprised by a rod shaped electrode is also fixed to the container 11, preferably in parallel to the axis of hollow tube of the cathode 8. If desired, a ring electrode is connected at the top of the rod electrode so as to be positioned between the cathode 8 and the window 13.

The axis of hollow tube is, preferably, made in axial alignment with the central portion of the window 13. The hollow tube shaped electrode 8 has an opening 10 in its side wall at the opposite side of the window 13 of the container 11. The opening is made by a hole or a rectangular aperture, and its diameter or width is preferably made about or less than a half of the diameter of the hollow tube cathode 8. Through the port 10 and the window 13, radiation intensity of the beam producing means can be measured as will be explained in more detail later.

The atomic vapor introducing means comprises a burner 21 provided with plural inlets 22, 23, 24. A flame 3 is supplied with fuel and oxygen through inlets 22, 23, respectively, from suitable sources and it is employed to form the atomic vapor of the substance to be analyzed. This substance is introduced into the flame through inlet 24 in a form of a sample solution.

The detecting means 6 is comprised by a conventional photo cell or a photo multiplier and, preferably, further electric filtering means 14. As an alternative to the use of the electric filtering means, a conventional amplifier designed to respond only to alternating current input signals of a predetermined frequency, can be used.

When an electric energizing potential from source 16 of an appropriate voltage value is connected between the cathode 8 and the anode 9 by lines 17, 18, there occurs a corona or an abnormal glow discharge between the electrodes in the container 11. Positively ionized atoms of inert gas produced by the discharge hit the surface of the cathode 8 and produce an atom vapor of the substance of the cathode. This phenomenon is called "sputtering." Some of the atomic vapor spontaneously emits radiation the spectrum of which contains a selected atomc spectral line at the wavelength peculiar to the substance. This radiation is considered due to the transition of an electron dropping from an excited state within the atomic structure back to a ground state.

The radiation including the selected wavelength is taken out as a beam from the hollow tube shaped cathode 8 through a window 13. Subsequently, the beam is modulated or interrupted by beam interrupting means 5, for example, a chopper, at a frequency from 25 c./s. to 10 kc./s. Then, the beam is passed through flame 3 which contains a substance to be analyzed in the form of an atomic vapor. During the passage through the flame, some portion of the beam is absorbed by the atomic vapor, giving energy to the atom. As a result, some atoms are excited from a ground state to an excited state. This phenomenon is well known as the atomic absorption phenomenon. The quantity of the absorption is theoretically determined by the Lambert-Beer formula:

$$I_t = I_0 e^{-\epsilon bc}$$

therein, $I_0$: radiation intensity of a beam at the entrance of a flame,
$I_t$: radiation intensity of the beam having passed through the flame,
$\epsilon$: absorption coefficient of a substance to be analyzed,
$b$: thickness of the flame,
$c$: concentration of the substance in a form of an atomic vapor.

Consequently, the concentration of the substance in a sample solution can be measured by detecting $I_t$ for a given $I_0$.

On the other hand, it happens that the flame itself emits radiation the spectrum of which also contains an atomic spectral line at the wavelength peculiar to the substance not only because of high temperature of the flame but also because of the absorption of the beam. At the same time, it emits radiation of other lines which directly give error signals to the instrument.

The beam having passed through the flame is turned back by beam turning back means 4, for example, a reflecting mirror, to the beam producing means 1. Through the beam is shown as being turned back along the same path it followed to reach the beam turning back means 4, it may be turned back in a different way without passing again through the flame 3 or the chopper 5. It is also easily understood that the flame 3 or the chopper can be placed only in the turning back path. These modifications can be easily accomplished by means of conventional spectro instruments, such as mirrors.

When the beam is returned back to the hollow tube shaped cathode 8, it is absorbed by the atomic vapor of the substance floating in the hollow tube. At this point only the beam of the atomic spectral line excites some of the atoms of the ground state to the excited state. After an average time period which may be called the life time of the resonance state, these atoms return to the ground state and they emit photons or radiation of the specific wavelength. Consequently the constant radiation intensity within the cathode is increased exactly by the amount of this radiation. This radiation propagates in all directions by diffusion. This phenomenon may be called the resonance radiation.

It should be noted that the radiation of the other lines emitted by the flame which have not enough energies cannot stimulate this resonance radiation. Thus, it follows that radiation intensity due to the resonance radiation is proportional to the amount of the beam turned back to the beam producing means. In addition, the amount of the beam turned back has a specific relationship with the amount of the substance in the flame as explained above due to the absorption phenomenon. Accordingly, it can be appreciated that through use of these phenomena the beam producing means itself is used as a spectral filtering device in this invention and the need for a separate spectral filtering device is obviated.

Figure 3:
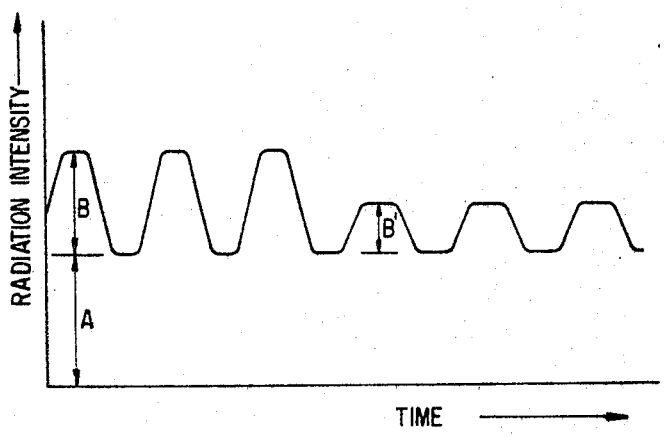
FIGURE 3 is a typical characteristic operating curve for the present apparatus illustrating the output measurement of the radiation intensity slotted against time.

The intensity of the resonance radiation is detected through an opening 10 and a window 12 by means of detecting means 6 which is disposed at the window 12 so as not to be affected by the direct radiation beam turned back to the hollow tube shaped cathode 8. Preferably, absorbing means similar to means 20 may also be provided within the cathode 8 for absorbing direct beam reflection. By a provision of direct beam baffling means within the cathode, other configuration or manners for detecting may be also employed. In this embodiment, since the beam is modulated by the chopper 5 at a certain frequency, the intensity of the resonance radiation pulsates at the same frequency. Accordingly, the radiation intensity detected includes a constant component A due to the radiation by a constant glow discharge and pulsating components B, B' due to the resonance radiation as shown in FIGURE 3. Amplitudes of these pulsating components are proportional to the radiation intensity of the beam turned back. These pulsating components can be easily selected by conventional electrical filtering means connected at the output of the detecting means 6 and supplying a meter 15 or other indicating means. Alternatively, a conventional amplifier 14 which is not responsive to a constant input signal also can be used for filtering means 14 as well as for amplifying means.

As previously explained, since the radiation emitted by the flame contains the atomic spectral line at the wavelength peculiar to the substance to be analyzed, it also affects or causes the resonance radiation. However, it is found that the radiation intensity by the flame which causes the resonance radiation has a close relationship with the frequency of the chopper 5. It is found that the intensity returned back to the beam producing means is reduced to less than one-fifth of its original value when the beam is modulated at 25 cycle/sec. by the chopper 5. When the beam having passed through the chopper 5 and the flame 3 is turned back through a different path to the beam producing means 1, back ground signals due to the radiation of the flame is observed to be reduced or excluded more effectively by the filtering means 14.

Though, in the above explanation, a hollow tube shaped cathode 8 of the same substance to be measured is used for the beam producing means, other configuration may be more desirable in certain instances. For example, in order to analyze or measure, mercury, sodium, and potassium which have a very high vapor pressure, a discharge tube containing gas of one of these substances preferably may be used.

From the foregoing description, it will be appreciated that by making use of the resonance radiation in the beam producing means, much simpler and cheaper configurations can be employed in an apparatus for spectrochemical analysis. This is due to the fact that the need for separate complex and expensive spectral filtering means has been obviated thereby making available an apparatus which can be operated with a minimum of difficulty by relatively unskilled personnel.

Since many modifications and variations may be made in the described apparatus without departing from the spirit of the invention, the foregoing description is to be considered as exemplary and not in a limiting sense. It is therefore to be understood that changes may be made in the particular embodiment of the invention disclosed which are within the full intended scope of the invention as defined by the appended claims.

We claim:

1. An apparatus for spectrochemical analysis comprising means for producing a beam of radiation into a path the spectrum of which contains a spectral line peculiar to the substance to be analyzed, said means including the same substance as that to be analyzed in a form capable of being stimulated from a ground state of atomic energy level to an excited state; means disposed in the path of said beam for turning back said beam to said beam producing means; means for introducing the substance to be analyzed in the form of an atomic vapor into the path of said beam; and detecting means optically coupled to said beam producing means for detecting radiation intensity within said beam producing means; whereby, the beam returned back to said beam producing means stimulates a resonance radiation phenomenon in the substance in said beam producing means and the intensity of the resonance radiation within said beam producing means is detected as an indication of the amount of the substance to be analyzed.

2. An apparatus for spectrochemical analysis according to claim 1, in which said beam turning back means is disposed in the path of said beam subsequent to said beam having passed through said atomic vapor to be analyzed for turning back said beam to said beam producing means.

3. An apparatus for spectrochemical analysis according to claim 1, further comprised by means disposed in the path of said beam for interrupting said beam at a predetermined frequency.

4. An apparatus for spectrochemical analysis according to claim 2, further comprised by means disposed in the path of said beam between said beam producing means and said atomic vapor to be analyzed introducing means for chopping said beam at a predetermined frequency.

5. An apparatus for spectrochemical analysis according to claim 1, in which said beam producing means includes transparent portion through which the radiation intensity of said beam producing means is detected by said detecting means and said beam producing means further includes means for preventing the direct beam turned back by said beam turning back means from directly impinging upon said detecting means.

6. An apparatus for spectrochemical analysis according to claim 1, in which said beam producing means includes a source of electric excitation potential, an evacuated container containing the same substance as that to be analyzed, and a pair of electrodes operably disposed within the container and connected to said source of excitation potential.

7. An apparatus for spectrochemical analysis according to claim 1, in which said beam producing means comprises a source of electric excitation potential, a container containing an inert gas, and a pair of electrodes at least one of which is made of the same substance as that to be analyzed, both said electrodes being operably disposed within the container and connected to said source of excitation potential.

8. An apparatus for spectrochemical analysis according to claim 7, in which said pair of electrodes comprises a hollow tube shaped cathode electrode made of the same substance as that to be measured, fixed to said container and an anode electrode fixed to said container.

9. An apparatus for spectrochemical analysis according to claim 1, in which said beam turning back means turns back said beam along the same path to said beam producing means that the beam has traversed in reaching the beam turning back means.

10. An apparatus for spectrochemical analysis according to claim 3, in which said detecting means includes photoelectric means and means operably coupled with said photoelectric means for selecting electrical output of the predetermined frequency for indicating the intensity of the radiation detected by said detecting means.

11. An apparatus for spectrochemical analysis according to claim 10, in which said frequency selecting means includes alternating current amplifying means.

12. An apparatus for spectrochemical analysis according to claim 6, in which said container has two transparent portions through one of which the beam is introduced into the path toward said atomic vapor introducing means, and through the other of which the radiation intensity of said beam producing means is detected by said detecting means.

13. An apparatus for spectrochemical analysis according to claim 8, in which said hollow tube shaped cathode electrode has an opening in its side wall and said container has two transparent portions through one of which the beam is introduced into the path toward said atomic vapor introducing means, and through the other of which the radiation intensity of said beam producing means is detected through the opening provided in said hollow tube shaped cathode electrode.

14. An apparatus for spectrochemical analysis according to claim 3, in which said predetermined frequency is chosen above 25 c./s.

15. An apparatus for spectrochemical analysis according to claim 7, in which said source of electric excitation potential has a value sufficient to cause a corona discharge between said pair of electrodes in said evacuated tube containing said inert gas of a certain pressure.

16. An apparatus for spectrochemical analysis according to claim 15, in which said source of electro excitation potential is comprised by a direct potential source.

References Cited

UNITED STATES PATENTS

| | | |
|---|---|---|
| 2,212,211 | 8/1940 | Pfund. |
| 2,847,899 | 8/1958 | Walsh. |
| 3,242,371 | 3/1966 | Suqawara et al. |

OTHER REFERENCES

Research Note, "Resonance Radiation From a Hollow-Cathode," June 2, 1959, pp. 883–885 relied on, from Spectrochemical Acts, 1959 volume 10.

"Recent Developments in Atomic Absorption Analysis," D. J. David, Sept. 24, 1963, p. 1192 relied on, from Spectrochemical Acts, 1964 volume 20.

RALPH G. NILSON, Primary Examiner

C. M. LEEDOM, Assistant Examiner

U.S. Cl. X.R.

313—205, 209; 250—217; 356—87, 97